United States Patent
Challapali

(10) Patent No.: US 6,715,076 B1
(45) Date of Patent: Mar. 30, 2004

(54) VIDEO SIGNAL AUTHENTICATION SYSTEM

(75) Inventor: Kiran Challapali, Stamford, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/422,737

(22) Filed: Oct. 21, 1999

(51) Int. Cl.[7] .............................. H04L 9/12; H04N 7/167

(52) U.S. Cl. ........................................ 713/176; 380/210

(58) Field of Search .................................. 713/176, 161, 713/160, 181, 200, 151, 153; 380/211, 217, 210

(56) References Cited

U.S. PATENT DOCUMENTS

| | | | |
|---|---|---|---|
| 5,499,294 A | | 3/1996 | Friedman .................... 380/10 |
| 5,870,474 A | * | 2/1999 | Wasilewski et al. ........ 380/211 |

FOREIGN PATENT DOCUMENTS

| | | |
|---|---|---|
| WO | 9909743 | 2/1999 |

* cited by examiner

Primary Examiner—Matthew Smithers

(57) ABSTRACT

A video signal authentication system utilizes selected portions of a video signal to generate authentication codes that are transmitted in association with respective portions of the signal. The video signal preferably is in compressed format and includes synchronizing codes. The data between synchronizing codes preferably is used as discreet portions of the video signal. Each discreet portion is utilized with a selectively known key and a hash-based authentication code generating strategy to generate an authentication code. Each video portion preferably has its own authentication code. The authentication code is appended to the portion of the video signal and transmitted from a first location to the second location. At the second location, the same authentication code generating strategy is performed on the received portion of video data to generate a received authentication code. The transmitted authentication code is then compared to the received authentication code to verify the authenticity of the transmitted portion of the video signal.

28 Claims, 2 Drawing Sheets

VIDEO SIGNAL AUTHENTICATION SYSTEM

BACKGROUND OF THE INVENTION

1. Field of the Invention

This invention relates to a system for authenticating transmitted video signals by selecting portions of the video signal and generating authentication codes that are transmitted with those portions for verification at a receiving location.

2. Description of the Related Art

Transmission of video signals is widely used for a variety of purposes. In some circumstances, the channels of communication are tightly controlled and it is reasonable to conclude that a received signal is exactly consistent with a transmitted signal. In many, if not most, circumstances, however, the communication channels are not tightly controlled. Therefore, it is necessary for two parties who are communicating with each other to authenticate received signals to ensure that the received signal is from an expected source and has not been tampered with in transit. Ideally, an authentication strategy verifies that a received signal is from the appropriate source (i.e., authenticity) and that the content is what was sent by the transmitter (i.e., signal integrity).

A variety of strategies have been proposed for authenticating signals in transit. Encryption algorithms have been utilized in a variety of fields including remote keyless entry systems and video systems. One example of a video system authentication strategy is shown in U.S. Pat. No. 5,499,294. In that arrangement a digital camera processor includes a private key that is embedded into the processor. Digital cameras having a public key that corresponds to the private key are able to receive information from the processor and to determine, using a known strategy, whether the received signal is from the appropriate source.

One limitation on currently proposed systems is that they are not capable of efficiently handling large amounts of video data. Another limitation is that many proposals do not provide a secure enough system that is effectively tamper proof. There is a need for a system that handles large amounts of video data in an efficient manner and provides results that are sufficiently secure. This invention addresses that need by providing a unique approach to authenticating video signals that are transmitted from one location to another.

SUMMARY OF THE INVENTION

This invention is useful for authenticating a video signal that is transmitted from one location to a second location. A system designed according to this invention identifies portions of a video signal and provides an authentication code for each portion that is then used for authentication purposes at a receiving location.

A system for ensuring the authenticity of data within a video signal that is transmitted from a first location to a second location, which is designed according to this invention, includes several components. A selector module selects at least one portion of the video signal. An authentication code generating module appends a key to the selected portion and then generates an authentication code using the appended portion. A transmitter portion appends the authentication code to the selected portion of the video signal and transmits the appended portion, including the authentication code, from the first location.

In the most preferred embodiment, the selector module identifies portions of the video signal by locating synchronizing codes in the video signal and choosing the data between adjacent synchronizing codes as each selected portion. Preferably an entire video signal is processed so that a plurality of portions between adjacent synchronizing codes each have a unique authentication code associated with them when the video signal is transmitted from the first location to the second location. At the second location, a second selector module identifies each portion of the transmitted signal. A deciphering module appends the key, which is the same as the key used at the first location, to the selected portion and then generates a second authentication code using the appended portion. An authentication module then authenticates the video signal at the second location by determining whether the second authentication code matches the authentication code that was sent along with the transmitted video signal portion.

A method associated with this invention includes several basic steps. First, a portion of a video signal is selected. Preferably, portions of the video signal are selected as the data between synchronizing codes associated with the video signal. A key is appended to at least one of the selected portions. An authentication code is generated using the appended selected portion. The authentication code is then appended to the selected portion and both are transmitted from the first location to the second location. At the second location a received signal portion is utilized to generate an associated second authentication code using the same key as used at the first location. The second authentication code is compared with the authentication code received from the first location to verify the authenticity of the transmitted signal.

A computer-readable medium including a plurality of computer-executable instructions for ensuring the authenticity of a video signal, which is transmitted from a first location to a second location, that is designed according to this invention includes several basic instructions. A first instruction directs a computer to select a portion of the video signal. A second instruction directs the computer to append a key to the selected portion. A third instruction directs the computer to generate an authentication code using the appended selected portion. A fourth instruction directs the computer to append the authentication code to the selected portion of the video signal so that both can be transmitted from the first location to the second location.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
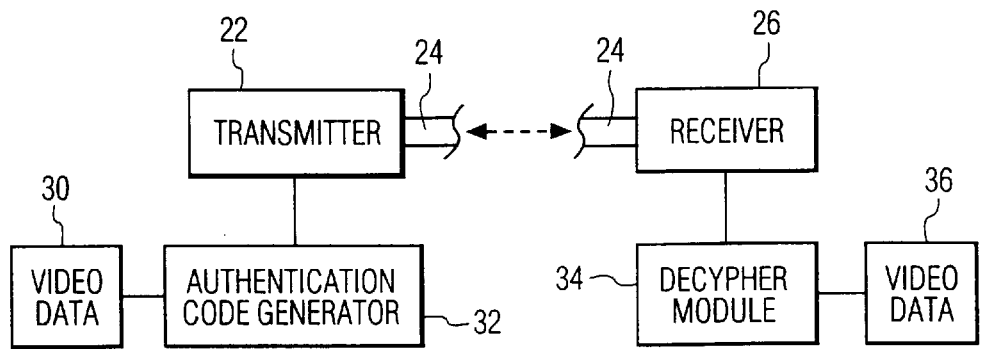
FIG. 1 schematically illustrates a system designed according to this invention.

FIG. 1 schematically illustrates a system 20 for communicating video signals from a first location to a second location. A transmitter 22 transmits a video signal along a communication link 24 to a receiver 26. The communication link 24 may be fiber optic, transmission lines, Internet, satellite link or any other suitable communication medium for transmitting video signals. At the first location, the transmitter 22 is provided with information (i.e., video data) from a video data-handling module 30 and an authentication code generating module 32. The video data-handling module 30 preferably processes video data that is in a compressed format. The video data-handling module 30 preferably identifies at least one portion of the video signal that will be used with the authentication strategy of this invention. Most preferably, each portion of the video signal is authenticated according to this invention so that an entire transmission can be verified.

The authentication code generating module 32 preferably takes the selected portion of video data and subjects it to an authentication code generating strategy that will be described in more detail below, using a preselected key to generate an authentication code. The authentication code is then appended to the selected portion of the video signal and both are transmitted by the transmitter 22.

At a second, remote location the receiver 26 receives the video signal including at least one appended portion having an authentication code associated with it. A deciphering module 34 preferably utilizes the same key as the authentication code generating module 32 and the selected portion of the video signal to generate a second authentication code. The second authentication code is then compared with the authentication code that was transmitted by the transmitter 22 to verify the authenticity and integrity of the received portion of the video signal. A video data-handling module 36 preferably utilizes only authenticated portions of the video signal as desired (i.e., to display a received signal or store it in memory).

It should be noted that although individual modules or portions are schematically illustrated in FIG. 1, a system designed according to this invention does not necessarily include that number of discreet components. The functions performed by each portion could be integrated into a single computer, for example. Similarly, a greater number of discreet components or devices could be utilized than schematically illustrated in FIG. 1. Additionally, it should be noted that although the transmitter 22 and receiver 26 are identified as such, each could be a transceiver so that two way communication is possible at each location.

Figure 2:
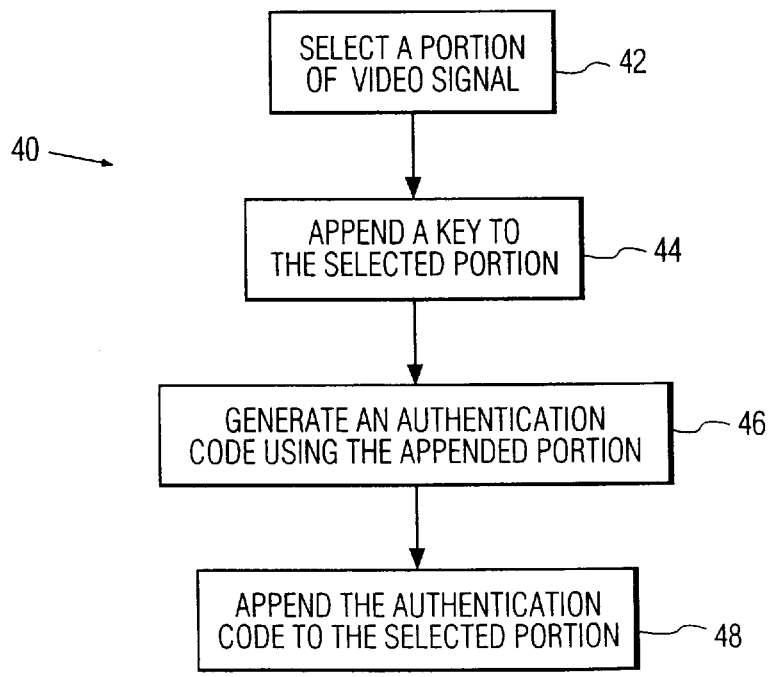
FIG. 2 is a flow-chart diagram illustrating a method associated with this invention.

FIG. 2 includes a flow chart diagram 40 that illustrates a method associated with this invention. At 42, at least one portion of the video signal is selected. Next, at 44, a key is appended to the selected portion. The key preferably is a secret key that is shared by the transmitter 22 and receiver 26. An authentication code is then generated using the selected portion having the key appended to it at 46. The result is an authentication code that is then appended to the selected portion of the video signal at 48 prior to transmitting the video signal.

Figure 3:
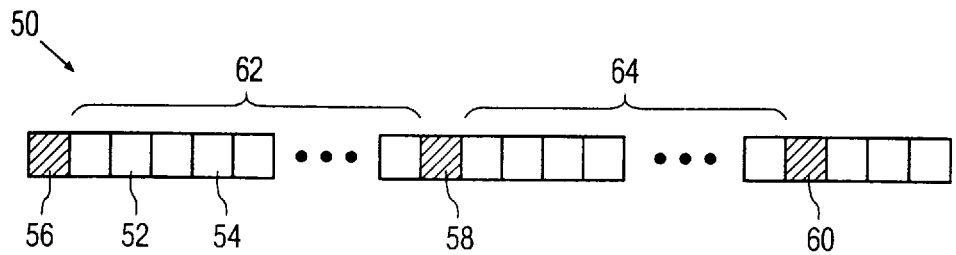
FIG. 3 schematically illustrates a compressed video signal stream.

FIG. 3 schematically illustrates a compressed video signal stream 50. The compressed video signal includes a plurality of bits of data such as Bits 52 and 54. At certain intervals along the stream of video data, synchronizing markers or codes are provided in conventional fashion. FIG. 3 schematically illustrates synchronizing codes 56, 58 and 60. Synchronizing codes are also known as resynchronization markers, resynchronizing codes, slice codes, slice markers and by other names known in the art. This application utilizes the term synchronizing codes generically to describe all such indicators. Synchronizing codes are utilized in video transmission systems for known purposes that need not be described in this specification.

This invention includes identifying data between adjacent synchronizing codes and selected that data as a portion of the video signal to be authenticated.

For example, the synchronizing codes 56, 58 and 60 are spaced along the stream of video signal information. A first portion of the video signal 62 is between the synchronizing codes or markers 56 and 58. A second portion of the video signal 64 is between the adjacent synchronizing markers 58 and 60. In the preferred embodiment, every portion of the video signal preferably is identified and subjected to the authentication strategy described in this specification. Alternatively, less than all of the portions may be used for authentication purposes. The method associated with this invention is efficient enough, however, that all portions of the video signal preferably are utilized with the authentication strategy of this invention.

Figure 4:
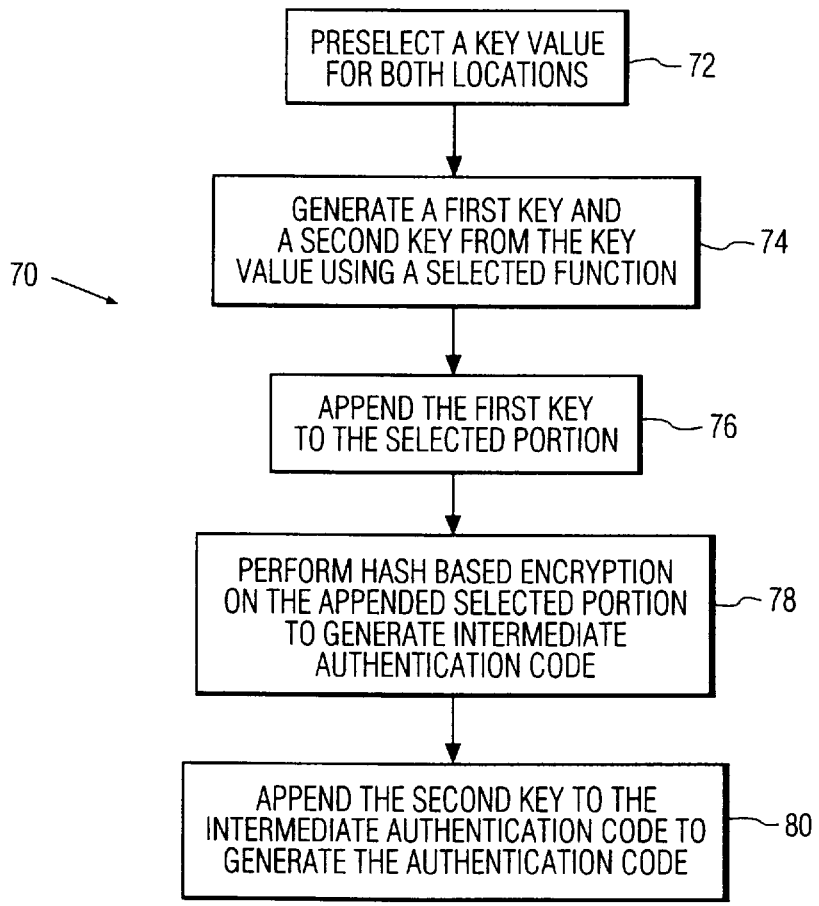
FIG. 4 is a flow-chart diagram illustrating more detail of selected portions of the flow-chart diagram of FIG. 2.

FIG. 4 includes a flow chart diagram 70 that illustrates more details about the steps 44 and 46 from FIG. 2. The preferred arrangement includes having a secret key value that is pre-selected and known at the first and second locations. The pre-selected key value is used to generate a first key and a second key using a selected function.

In one example, the function for generating the first key and the second key includes appending enough zeros to the string of data identified as the key value to create a 64 byte string. That 64 byte string preferably is then exclusive ORed (i.e. XOR) with a data string known as ipad. In one example, ipad equals the byte 0×5C repeated to pad a block. The result of the exclusive ORed function is the first key.

The second key is generated in one example by using the same 64 byte string (i.e. the key value with the appended zeros) and exclusive ORing (i.e. XOR) the 64 byte string with a data string known as opad. In one example, opad is the byte 0×36 repeated to pad a block. The result of the preferably bit wise exclusive ORing function is the second key identical first and second keys preferably are derived at the first and second locations so that the first and second keys are identical at each location.

Once the first and second keys have been derived from the preselected key value, the selected portion of the video signal is then preferably subjected to the following procedure. At 76 the first key is appended to the selected portion of the video signal. At 78 a hash-based Authentication code generating function is performed on the appended selected portion to generate an intermediate authentication code. Hash-based authentication code generating functions are known in the art and those having the benefit of this description will be able to choose from among hash-based functions or to design one to accomplish the results provided by this invention.

Next, at 80, the second key is appended to the intermediate authentication code to generate the authentication code that is then appended to the selected video portion and transmitted by the transmitter 22. By utilizing the two-stage application of the hash function to generate an intermediate authentication code and then using that to generate the transmitted authentication code, this invention provides an extremely secure authentication strategy. In situations where the compressed video signal is in the MPEG format having a user data field, the authentication code preferably is placed into the user data field prior to transmission.

By utilizing the video data between synchronizing codes, this invention provides an extremely efficient way of handling large amounts of compressed video data and providing a secure strategy for authenticating that data. By selecting portions of the video data between the synchronizing codes, this invention provides a way of handling the video data in a manner that is computationally feasible yet not so small that the "overhead" associated with generating the authentication code is so great that it would compromise the speed or performance of the transmission of the signal. Additionally, by identifying the selected portions of the video data, an error in one portion of a transmitted signal is isolated from other portions of the signal and only that portion containing an error need by rejected.

At the receiving location, the same key value is used to generate first and second keys that are identical to those generated at the first location. The first key is then appended to received portion of the video signal and the hash-based function is performed on the appended portion. This generates a received intermediate authentication code. Then the second key is appended to the received intermediate authentication code to generate a received authentication code. The received authentication code is then compared with the authentication code that was transmitted with the portion of the video signal. If the two authentication codes match, then the portion of the video signal has been proven authentic.

The preceding description is exemplary rather than limiting in nature. Variations and modifications to the disclosed example may become apparent to those skilled in the art that do no necessarily depart from the spirit and basis of this invention. The scope of legal protection given to this invention can only be determined by studying the following claims.

What is claimed is:

1. A method of ensuring the authenticity of data within a video signal that is transmitted from a first location to a second location, comprising the steps of:
   (A) selecting at least one portion of a video signal;
   (B) appending a key to the selected portion;
   (C) generating an authentication code using the appended selected portion from step (B); and
   (D) appending the authentication code to the selected portion of the video signal prior to transmitting the video signal to the second location.

2. The method of claim 1, wherein step (A) includes identifying synchronizing codes within the video signal and selecting the portion of the video signal between adjacent synchronizing codes.

3. The method of claim 1, wherein there are a plurality of video signal portions between a series of synchronizing codes and the method includes performing steps (A) through (D) for each of the plurality of portions.

4. The method of claim 1, wherein the video signal includes a plurality of portions between adjacent sets of slice codes and step (A) includes identifying a portion of the video signal between adjacent slice codes.

5. The method of claim 1, including preselecting a base key value and generating a first key and a second key, using the base key value and a chosen key generating function.

6. The method of claim 5, wherein steps (B) and (C) include:
   appending the first key to the selected portion of the video signal;
   generating a first authentication code using the appended signal portion;
   appending the second key to the first authentication code; and
   generating a second authentication code using the appended first authentication code and using the second authentication code as the authentication code of step (C) when performing step (D).

7. The method of claim 1, wherein step (C) includes using a hash based authentication code generating function.

8. The method of claim 1, including receiving the transmitted signal at the second location, performing steps (A) through (C) on the received signal to generate a received signal authentication code and then determining whether the received signal authentication code matches the authentication code generated at the first location.

9. The method of claim 8, including performing steps (B) and (C) at the first location by: preselecting a base key value and generating a first key and a second key, using the base key value and a preselected key generating function;
   appending the first key to the selected portion of the video signal;
   generating a first authentication code using the appended signal portion;
   appending the second key to the first authentication code; and
   generating a second authentication code using the appended first authentication code and using the second authentication code as the authentication code of step (C) when performing step (D).

10. The method of claim 9, including performing steps (B) and (C) at the second location by:
    generating a first key and a second key, using the preselected base key value and a preselected key generating function;
    appending the first key to the selected portion of the received video signal;
    generating a first received authentication code using the appended signal portion;
    appending the second key to the first received authentication code; and
    generating a second received authentication code using the appended first authentication code.

11. The method of claim 10, including determining whether the second received authentication code matches the second authentication code to thereby verify the authenticity of the video data in the received signal.

12. The method of claim 1, including performing steps (A) through (D) using a compressed video signal.

13. The method of claim 12, wherein the compressed video signal is an MPEG signal having a user data field and wherein step (D) includes placing the authentication code into the user data field.

14. A system for ensuring the authenticity of data within a video signal that is transmitted from a first location to a second location, comprising:
    a selector module that selects at least one portion of the video signal;
    an authentication code generating module that appends a key to the selected portion and then generates an authentication code using the appended portion; and
    a transmitter portion that appends the authentication code to the selected portion and transmits the appended portion including the authentication code from the first location.

15. The system of claim 14, wherein the authentication code generating module uses a known key value to generate a first key and a second key and wherein the authentication code generating module appends the first key to the selected portion, generates an intermediate authentication code using the appended portion, appends the second key to the intermediate authentication code and generates the authentication code using the appended intermediate authentication code.

16. The system of claim 14, including:
a second selector module at the second location that selects the portion of the transmitted signal;
a deciphering module that appends the key to the selected portion and then generates a second authentication code using the appended portion; and
an authentication module that authenticates the video signal at the second location by determining whether the second authentication code matches the first authentication code.

17. The system of claim 16, wherein the deciphering module uses a known key value to generate a first key and a second key and wherein the deciphering module appends the first key to the received selected portion, generates an intermediate authentication code using the appended portion, appends the second key to the intermediate authentication code and generates the second authentication code using the appended intermediate authentication code.

18. The system of claim 14, wherein the selector module identifies portions of the video signal located between adjacent synchronizing codes.

19. The system of claim 14, wherein the selector module identifies portions of the video signal located between adjacent slice codes.

20. The system of claim 14, wherein the authentication code generating module uses a hash based function to generate the authentication code.

21. The system of claim 14, wherein the video signal is a compressed signal having a MPEG format with a user data field and wherein the transmitter portion places the authentication code into the user data field prior to transmitting the signal.

22. A computer-readable medium having a plurality of computer-executable instructions to execute process steps for ensuring the authenticity of a video signal that is transmitted from a first location to a second location, the computer-executable instructions comprising:
a first instruction for selecting at least one portion of a video signal;
a second instruction for appending a key to the selected portion;
a third instruction for generating an authentication code using the appended selected portion from step (B); and
a fourth instruction for appending the authentication code to the selected portion of the video signal.

23. The computer-readable medium of claim 22, wherein each of the computer-executable instructions comprises a plurality of lines of programming code.

24. The computer-readable medium of claim 22, wherein the second and third instructions include instructions for:
preselecting a base key value and generating a first key and a second key, using the base key value and a preselected key generating function;
appending the first key to the selected portion of the video signal;
generating a first authentication code using the appended signal portion;
appending the second key to the first authentication code; and
generating a second authentication code using the appended first authentication code and using the second authentication code as the authentication code of the fourth instruction.

25. The computer-readable medium of claim 22, wherein the third instruction includes a hash based authentication code generating function that utilizes the selected signal portion.

26. The computer-readable medium of claim 22, wherein the first instruction includes instructions to identify at least one portion of the video signal located between adjacent synchronizing codes.

27. The computer-readable medium of claim 22, wherein the first instruction includes instructions to identify at least one portion of the video signal located between adjacent slice codes.

28. The computer-readable medium of claim 22, wherein the video signal is a compressed signal having a MPEG format with a user data field and wherein the fourth instruction includes instructions to place the authentication code in the user data field.

\* \* \* \* \*